United States Patent [19]

Lenhardt

[11] Patent Number: 4,523,303
[45] Date of Patent: Jun. 11, 1985

[54] SEISMIC DATA GATHERING CABLE

[75] Inventor: Wilfried K. Lenhardt, Richardson, Tex.

[73] Assignee: Mobil Oil Corporation, New York, N.Y.

[21] Appl. No.: 395,897

[22] Filed: Jul. 7, 1982

[51] Int. Cl.³ .............................................. G01V 1/16
[52] U.S. Cl. ...................................... 367/20; 367/152; 367/177; 339/151 C
[58] Field of Search .................. 367/76, 62, 65, 20, 367/21, 23, 152, 22, 177; 181/112; 339/151 C

[56] References Cited

U.S. PATENT DOCUMENTS 2,732,534  1/1956  Giel ................................. 339/151 C
3,863,200  1/1975  Miller ..................................... 367/65

Primary Examiner—Sal Cangialosi
Assistant Examiner—Ian J. Lobo
Attorney, Agent, or Firm—A. J. McKillop; M. G. Gilman; George W. Hager, Jr.

[57] ABSTRACT

A seismic data gathering system includes a seismic cable having a plurality of cable sections, each including a seismic detector and a pair of signal lines for carrying the seismic energy signals produced by the detector in response to seismic energy waves. A shunting resistance is located in each cable section with one end connected to one of the pair of signal lines and the other end connected through a mating connector to the other of the pair of signal lines in the next succeeding cable section so that a shunting resistance is added to the seismic cable each time a detector is added to the seismic cable. In this manner the electrical damping of each seismic detector remains constant when the seismic cable is coupled to a data acquisition unit regardless of the number of detectors included within the seismic cable.

2 Claims, 5 Drawing Figures

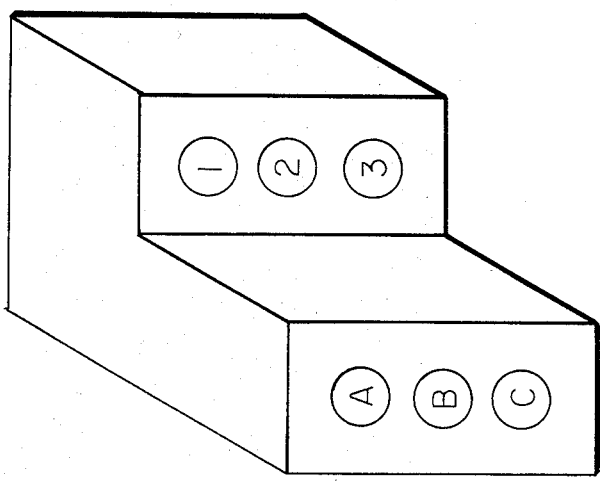
FIG. 5
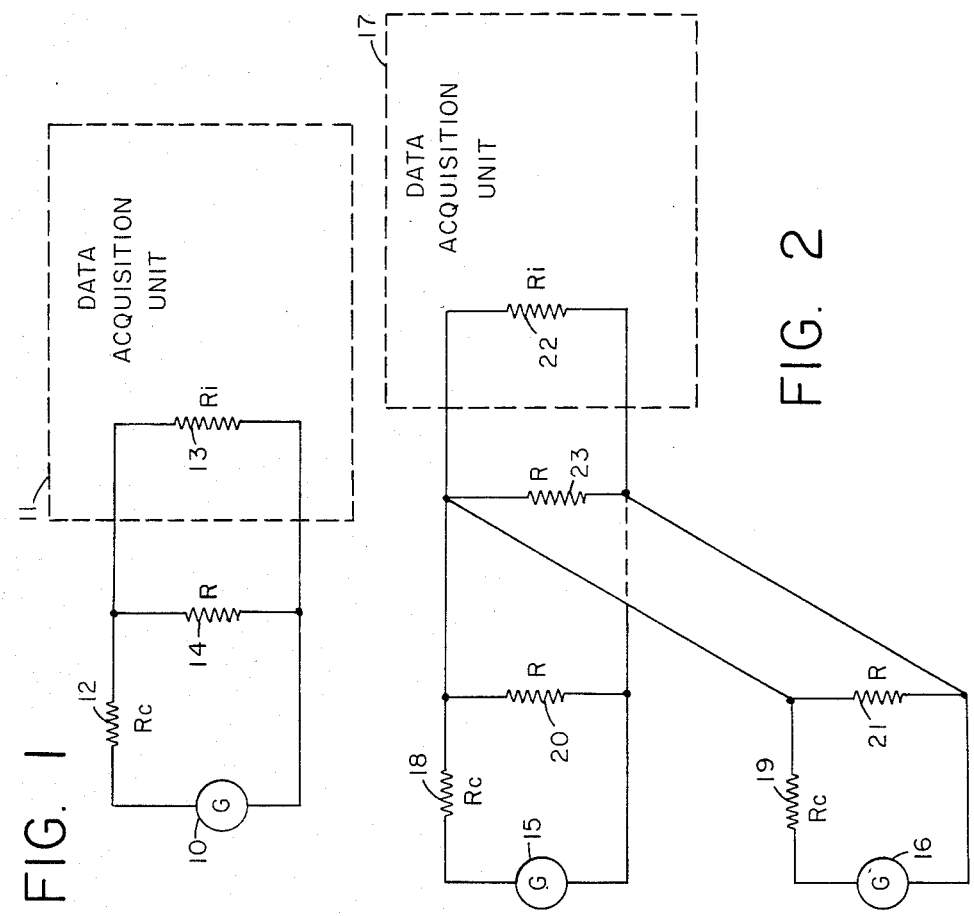
FIG. 2
FIG. 1

SEISMIC DATA GATHERING CABLE

BACKGROUND OF THE INVENTION

This invention relates to a seismic data gathering system and more particularly to a seismic cable for detecting and transmitting seismic reflection signals to a data acquisition unit.

In seismic exploration seismic energy is generated at a shotpoint at or near the surface of the earth for land exploration or in a water layer for marine exploration. The seismic energy is reflected from subsurface interfaces between subsurface layers of the earth, and is received by a spread of seismic energy detectors on the surface of the earth or in a water layer. These seismic energy detectors, commonly termed "geophones" for land exploration and "hydrophones" for marine exploration, are incorporated into a seismic cable which extends along the earth's surface or is towed in a water layer. The outputs of the seismic detectors are applied to a seismic data acquisition or recording system having a separate recording channel for each detector. These recording channels therefore contain information which can be used to represent the characteristics of the subsurface formations from which the seismic reflection signals have been detected by the seismic detector cable.

A seismic detector, such as a geophone, senses vibrations by means of movement of a coil of electrical conductors relative to a fixed permanent magnet in response to such vibrations. The coil traverses the magnetic line of flux of the permanent magnet and produces an electrical signal which is responsive in amplitude and frequency to the sensed vibrations. It is common practice to provide mechanical or electrical damping of the moveable components of the seismic detector. The present invention is particularly useful in providing a constant electrical damping for a plurality of parallel seismic detectors included in a seismic detector cable which is coupled to the input of a seismic data acquisition or recording system.

SUMMARY OF THE INVENTION

In accordance with the present invention there is provided a seismic detector cable having a plurality of seismic detectors spaced along such cable for detecting seismic energy waves and for providing a signal to a data acquisition unit representative of the detected seismic energy waves. The seismic detectors are connected within the seismic cable in such a manner that the electrical damping of each seismic detector is constant when the cable is coupled to the data acquisition unit, regardless of the number of detectors included within the cable. More particularly N−1 resistances, each having a resistance equal to the input resistance of the data acquisition unit, are connected in parallel with N−1 of the seismic detectors, N being the total number of seismic detectors. In this manner, the effective shunt resistance across each seismic detector is identical.

In a further aspect, the seismic cable employs a first section including a seismic detector having a parallel or shunt resistance so as to provide a desired damping with only such first section connected to the data acquisition unit. Additional cable sections provide for a plurality of additional seismic detectors each having a parallel or shunt resistance such that the effective dampings of all of the additional seismic detectors in the seismic cable is identical with the desired damping of the seismic detector within the first cable section.

In a further aspect, a plurality of cable sections each have a seismic detector and a pair of signal lines for carrying the seismic energy signals produced by the detector in response to the seismic energy waves. A plurality of mating connectors join the cable sections. Each connector includes at least three electrical terminals, first and second of such terminals connecting the pairs of signal lines between adjoining cable sections. A first shunting resistance is located in each cable section and has one end connected to a first of the pair of signal lines and the other end connected through a third of the electrical terminals of the mating connectors to the second of the pair of signal lines in the next succeeding cable section. In this manner, a shunting resistance is added to the seismic cable each time a seismic detector is added to the seismic cable.

In a yet further aspect, a second shunting resistance is located in each cable section having one end connected to the first of the pair of signal lines and the other end connected through a fourth of the electrical terminals of the mating connectors to the second of the pair of signal lines in the immediately preceding cable section. In this manner, the cable sections may be reversed without affecting the electrical characteristics of the seismic cable. The first and second shunting resistances are each preferably equal to twice the internal resistance of any data acquisition unit to which the seismic cable is attached.

BRIEF DESCRIPTION OF THE DRAWINGS

FIG. 1 illustrates a single seismic detector coupled to a data acquisition unit.

FIG. 2 illustrates two seismic detectors coupled in parallel to a data acquisition unit.

FIG. 5 illustrates a connector for use with the seismic detector cable of FIG. 4.

DESCRIPTION OF THE PREFERRED EMBODIMENT

Figure 3:
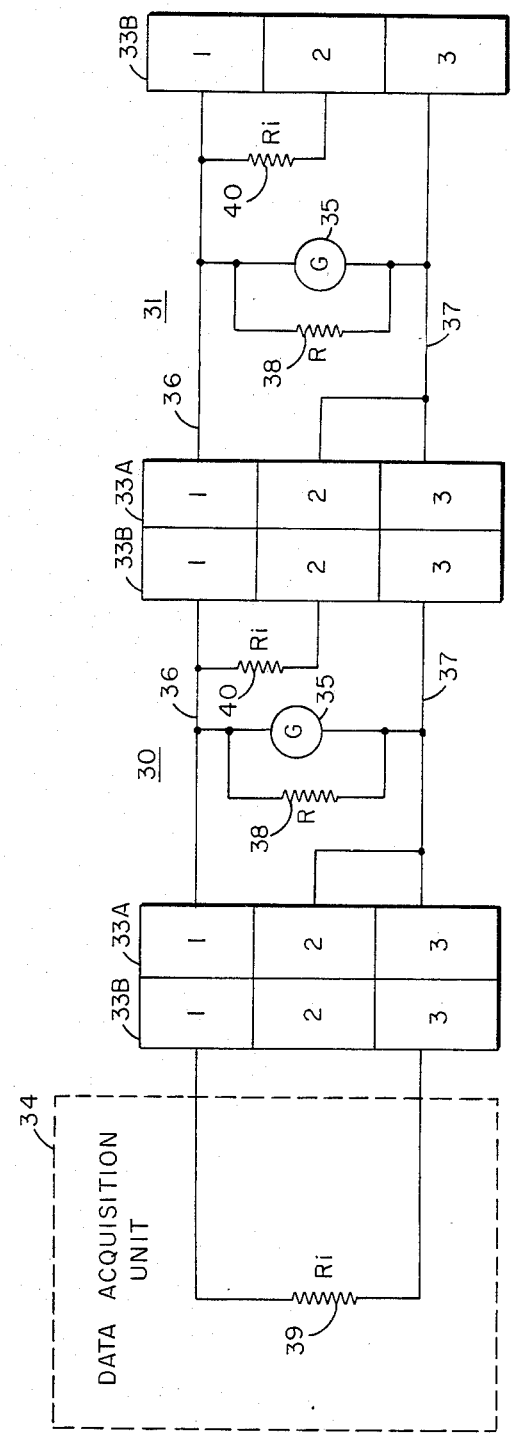
FIG. 3 illustrates a seismic detector cable in accordance with the present invention.

Referring now to FIG. 1, there will be described the seismic data gathering system of the present invention. In FIG. 1 there is shown a single seismic detector 10, such as a geophone, connected to a data acquisition unit 11. Detector 10 has a coil resistance 12 and data acquisition unit 11 has an input resistance 13. A parallel or shunt resistance 14 is selected to provide a desired total shunting resistance $R_s$ as follows:

$$R_s = \frac{R \times R_i}{R + R_i} \quad (1)$$

where:

R is the parallel resistance 14, and
$R_i$ is the data acquisition unit input resistance 13.

This total shunt resistance $R_s$ is related to detector damping in the following way:

$$b_t = b_o + K \frac{R_c}{R_c + R_s} \quad (2)$$

where:

$b_t$ = total detector damping related to critical damping of 1.0,
$b_o$ = open circuit damping,
$R_c$ = coil resistance,
$R_s$ = shunt resistance,
K = a constant determined by the seismic detector being used.

In FIG. 2 there is shown two seismic detectors 15 and 16 connected in parallel to a data acquisition unit 17 having an input resistance 22. Detectors 15 and 16 have equal coil resistances 18 and 19 respectively and equal parallel or shunt resistances 20 and 21 respectively. In this configuration the effective shunting resistance $R_s$ of each detector is as follows:

$$R_s = \frac{R \times 2R_i}{R + 2R_i} \quad (3)$$

where
R = parallel resistance 20 and 21,
$R_i$ = data acquisition unit input resistance 22.

It can be seen from equation (3) that the value of the effective shunting resistance $R_s$ for the two detector configuration of FIG. 2 is different from that of the single detector configuration of FIG. 1 as expressed in equation (1). Therefore, the electrical damping of the single detector of FIG. 1 has been changed by the parallel addition of a second detector as shown in FIG. 2.

By adding another shunt resistance 23, as shown by the dashed lines in FIG. 2, the damping of each of detectors 15 and 16 can be the same as for the single detector 10 of FIG. 1 as expressed in equation (1), provided the value of resistance 23 is equal to the input resistance 22 of the data acquisition unit 17.

Extending the foregoing to a seismic cable having N parallel seismic detectors, N−1 shunt resistors, equal in value to the internal resistance of the data acquisition unit to which the cable is to be connected, need to be added to the system so that each of the N detectors will have identical damping.

It is a specific feature of the present invention to provide a seismic detector cable in which additional seismic detectors can be added in parallel while maintaining constant damping of all detectors in the seismic cable. Such a cable is illustrated in FIG. 3. The cable includes a plurality of cable sections, two such sections 30 and 31 being shown for purposes of illustration. Such sections are joined together sequentially by mating connectors 33A and 33B. Likewise, the first section 30 is coupled to the data acquisition unit 34. Each section includes a seismic detector 35 connected between a pair of signal lines 36 and 37. Connected across each detector is a parallel or shunting resistance 38. The data acquisition unit to which the cable is connected has an input resistance 39.

To carry out the specific feature of maintaining constant detector damping all along the cable as additional sections are added, there is provided a shunting resistance 40 in each section equal to the value of the input resistance 39 of the data acquisition unit 34. As can be seen in FIG. 3, such shunting resistances 40 are connected across the signal lines 36 and 37 only by way of the mating connectors 33A and 33B. In this manner the shunting resistance 40 of cable section 30 is not connected into the seismic data gathering system should only cable section 30 be connected to data acquisition unit 34. In such event, the expression of equation (1) is fully met for a single detector cable. However, when section 31 is added to the cable, shunting resistance 40 of section 30 is connected through terminals 2 of connectors 33A and 33B to the signal line 37 in section 31. This effectively adds another shunting resistance, equal in value to the input resistance of the data acquisition unit, when the next succeeding cable section including seismic detector is added. As can be seen in FIG. 3, the shunting resistance 40 of the last cable section is not electrically connected across the signal lines 36 and 37. In this manner, the seismic cable of FIG. 3 meets the electrical requirements for constant detector damping of each seismic detector as expressed in equation (1).

In viewing the electrical characteristics of the seismic cable of FIG. 3 it is apparent that the cable sections 30 and 31 cannot be reversed without changing the effective damping of the seismic detectors. However, in an alternate embodiment shown in FIG. 4, any cable section can be reversed without changing the effective damping of the seismic detectors. Two such cable sections 40 and 41 are shown for purposes of illustration. In this embodiment cable sections 40 and 41 are joined together by connectors 43A and 43B, each being a 6-pin hermaphroditic connector as shown in FIG. 5. Both shunting resistances 44 and 45 are connected across the pair of signal lines 46 and 47 by way of these connectors 43A and 43B. For example, shunting resistance 44 is connected to signal line 46 within cable section 40 and is coupled by way of connector 43B-pin C and connector 43A-pin 3 to the other signal line 47 within the next succeeding cable section 41. Shunting resistance 45 is connected to signal line 46 within cable section 41 and is coupled by way of connector 43A-pin C and connector 43B-pin 3 to the other signal line 47 within the immediately preceeding cable section 40. With this electrical configuration for the seismic cable, shunting resistances 44 and 45 are connected in parallel across the signal lines 46 and 47 when cable sections 40 and 41 are mated together through connectors 43A and 43B. By selecting the values of resistances 44 and 45 to be equal to twice the internal resistance 48 of the data acquisition unit 49, the parallel combination of resistances 44 and 45 will equal that of internal resistance 48. It can, therefore, be seen that the cable configuration of FIG. 4 fulfills the requirements of equation (1) for constant damping of all seismic detectors.

Figure 4:
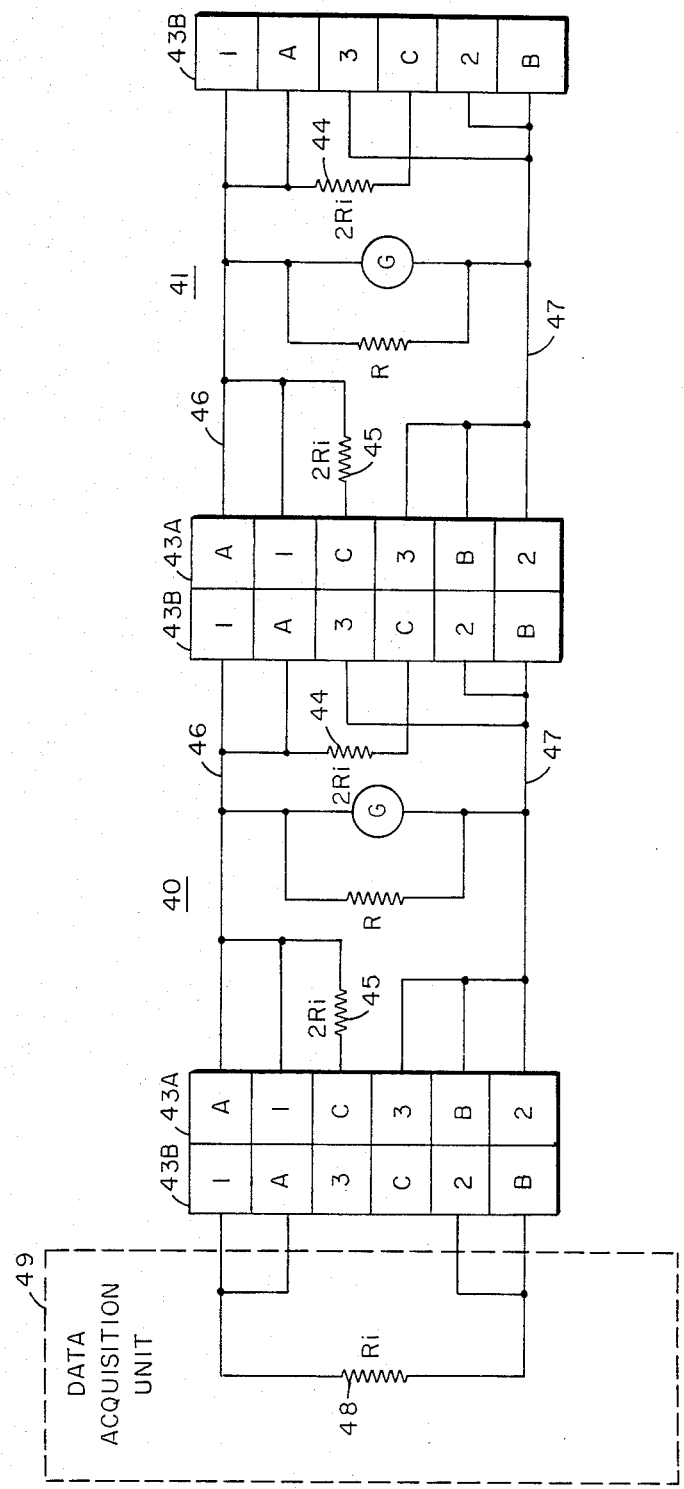
FIG. 4 illustrates an alternate embodiment of the seismic detector cable of FIG. 3.

By reversing cable section 41 in FIG. 4, for example, shunting resistance 44 of section 41 is paralleled with shunting resistor 44 of section 40. Shunting resistance 44 of section 41 is now connected to signal line 46 in section 41 and to signal line 47 in the immediately preceding section 40 by way of connector 43B-pin C in section 41 and connector 43B-pin 3 in section 40. Shunting resistance 44 of section 40 is connected to signal line 46 in section 40 and to signal line 47 in the next succeeding cable section 41 by way of connector 43B-pin C of section 40 and connector 43B-pin 3 of section 41.

By means of the alternate embodiment of FIG. 4, a seismic cable can be assembled in the field without regard to which direction a particular cable section should be oriented within the seismic cable and still maintain constant damping for all detectors in the seismic cable.

It is to be understood that the foregoing merely represents a preferred and alternate embodiment for the seismic cable of the present invention, and that other embodiments may be conceived and implemented without departing from the spirit and scope of the present invention as set forth in detail in the appended claims.

I claim:

1. A seismic data gathering cable, comprising:
   (a) a plurality of cable sections each having a seismic detector and a pair of signal lines for carrying the seismic energy signals produced by said detector in response to the detection of seismic energy waves,
   (b) a plurality of mating connectors between adjoining cable sections having at least four electrical terminals, first and second of said terminals connecting said pair of signal lines between said adjoining cable sections,
   (c) a first shunting resistance located in each cable section and connected between said pair of signal lines,
   (d) a second shunting resistance located in each cable section having one end connected to a first of said pair of signal lines within said cable section and the other end connected through a third of the terminals of said mating connectors to the second of said pair of second lines in the next succeeding cable section, and
   (e) a third shunting resistance located in each cable section having one end connected to a first of said pair of signal lines within said cable section and the other end connected through a fourth of the terminals of said mating connector to the second of said pair of signal lines in the immediately preceding cable section, whereby any of said cable sections may be reversed without affecting the electrical characteristics of said seismic cable.

2. The seismic cable of claim 1 wherein said second and third shunting resistances are each equal to twice the internal resistance of any data acquisition unit to which said seismic cable is attached.

* * * * *